(12) United States Patent
Segal

(10) Patent No.: US 7,809,480 B2
(45) Date of Patent: Oct. 5, 2010

(54) AUTONOMOUS FLIGHT FOR FLIGHT PLATFORMS

(75) Inventor: Tuvia Segal, Haifa (IL)

(73) Assignee: Steadicopter Ltd., Yoqneam (IL)

( * ) Notice: Subject to any disclaimer, the term of this patent is extended or adjusted under 35 U.S.C. 154(b) by 578 days.

(21) Appl. No.: 11/587,929

(22) PCT Filed: Sep. 26, 2005

(86) PCT No.: PCT/IL2005/001026

§ 371 (c)(1),
(2), (4) Date: Oct. 26, 2006

(87) PCT Pub. No.: WO2006/035429

PCT Pub. Date: Apr. 6, 2006

(65) Prior Publication Data
US 2007/0228221 A1    Oct. 4, 2007

(30) Foreign Application Priority Data
Sep. 28, 2004    (IL) ...................................... 164335

(51) Int. Cl.
*G05D 1/00*    (2006.01)
(52) U.S. Cl. .............................................. 701/4; 701/2
(58) Field of Classification Search ........................ None
See application file for complete search history.

(56) References Cited

U.S. PATENT DOCUMENTS

| | | | |
|---|---|---|---|
| 2,507,304 A | 5/1950 | Hofstadter | |
| 2,961,202 A | 11/1960 | Summerlin | |
| 3,057,584 A | 10/1962 | Bretoi | |
| 3,549,108 A | 12/1970 | Smith | |
| 4,109,886 A * | 8/1978 | Tribken et al. | 244/178 |
| 4,622,667 A * | 11/1986 | Yount | 714/11 |
| 5,676,334 A | 10/1997 | Cotton et al. | |
| 5,890,441 A * | 4/1999 | Swinson et al. | 244/12.3 |
| 6,431,494 B1 | 8/2002 | Kindead et al. | |
| 6,507,776 B1 | 1/2003 | Fox | |
| 6,584,383 B2 | 6/2003 | Pippenger | |
| 2003/0060943 A1* | 3/2003 | Carroll | 701/3 |
| 2004/0107027 A1 | 6/2004 | Boudrieau | |

OTHER PUBLICATIONS

International Search Report for International Application No. PCT/IL05/01026 mailed Dec. 14, 2006.

* cited by examiner

*Primary Examiner*—Michael J. Zanelli
(74) *Attorney, Agent, or Firm*—Pearl Cohen Zedek Latzer, LLP

(57) ABSTRACT

A method and system for autonomous or semi-autonomous flight of a flight platform with flight actuators is disclosed. The system comprises a stabilization subsystem for controlling the flight actuators to maintain stabilization of the flight platform in flight and a flight control subsystem for controlling the flight actuators to implement flight control of the flight platform in flight. The two subsystems operate separately, wherein the flight control subsystem is overridden by the stabilization subsystem in an event where the flight platform exceeds a predetermined stabilization threshold until the flight platform regains stability.

26 Claims, 7 Drawing Sheets

AUTONOMOUS FLIGHT FOR FLIGHT PLATFORMS

CROSS-REFERENCE TO RELATED APPLICATIONS

This application is a National Phase Application of PCT International Application No. PCT/IL2005/001026, entitled "Autonomous Flight for Flight Platforms", International Filing Date Sep. 26, 2005, published on Apr. 6, 2006 as International Publication Number WO 2006/035429; which in turn claims priority from Israel Patent Application No. 164335, filed Sep. 28, 2004.

FIELD OF THE INVENTION

The present invention relates to flight control and stabilization. More particularly it relates to providing full or partial autonomous flight capabilities to flight platforms.

BACKGROUND OF THE INVENTION

For successful autonomous flight, a flight platform must be capable of maintaining stability while carrying out a flight plan. This means all flight tasks such as: takeoff, hovering, flight in a defined route and landing. Flight physical parameters such as: position, velocity, acceleration or more specifically: altitude, vertical (z axis) climb or descent velocity or acceleration, horizontal (x, y axis) position, velocity or acceleration. This capability is particularly difficult to attain for relatively unstable flight platforms, such as small-scale model helicopters or other VTOL (vertical takeoff and landing) vehicles.

In addition to the inherent instability of the platform, it is difficult to calculate the correct output value levels to the servos/actuators that steer the platform in order to control and achieve the required flight parameters. This difficulty is caused by the fact that:

non-stable platforms, especially small-scale platforms, are very sensitive to any changes in their stabilization condition—even a small change for a very short period in the output, or in an environmental factor such as wind speed, can cause an immediate non-stable condition, input from the sensors regarding the platform flight conditions that are used to calculate the outputs, and the output signal itself, are not always accurate enough or might have insufficient response time or update time (frequency), especially with low end (small size, low weight and cost) sensors, the output range or the servo or the actuator resolution and accuracy might be relatively narrow, especially in small scale platforms, which are very sensitive to even very small changes in output, and there is a lag (delay between output and actual platform response), the amount of lag being subject to the flight parameters and the nature of the platform.

The present invention provides a system (and method) for stable autonomous (or semi-autonomous) flight of non-stable flight platforms. Most fixed wing platforms are designed to maintain stability during flight and will keep their flight condition in all six axes with minimum pilot correction. Non-stable platforms, such as rotating wing, cannot keep their flight condition and without active piloting they will roll over immediately, especially during hovering. This problem is exacerbated in small-scale non-stable platforms.

While the present invention is particularly advantageous for non-stable flight platforms, it can also be applied to improve the flight of inherently stable flight platforms.

The invention introduces the following innovations

Stabilization system and flight control system are separate and operate cooperatively with one another.

Stabilization system can have a dynamic parameter set that adjusts the stabilization parameters in accordance with weather conditions or platform weight changes, thereby improving the platform flexibility (amplitude) and the time required to recover platform stability time.

Instead of a single incremental control output signal, the system provides each cycle a group of outputs. The cycle length and magnitude of output to servos/actuators is modulated.

If a condition of extreme nonstability occurs, the flight control system is disengaged from the platform until the stabilization system regains acceptable stability.

In a case of temporary or major failure in the flight control system, the stabilization system will maintain the platform balanced until recovery and/or will perform an emergency autorotation landing.

A user has the option to temporarily override the flight control system with manual flight commands, or to select semi-auto mode for continuous operation with manual flight commands.

These innovations are now described in more detail.

The present invention comprises an underlying adjustable stabilization system that provides basic platform aerodynamic stabilization. The invention further comprises a flight control system on top of the stabilization system for controlling various flight parameters and navigation. This system (and corresponding method) overcomes the problem of controlling flight of nonstable platforms (and enhances flight of stable platforms).

The invention further provides dynamic stabilization parameter modification in order to adapt the platform stabilization behavior, flexibility, and recovery time dynamically in accordance with changes in external conditions such as wind magnitude and direction or platform weight changes. These external parameters are monitored, evaluated, and if necessary modified to maintain the required flexibility and recovery time of the platform.

The invention further provides a unique cyclic output method for controlling the required flight parameters via the platform's servos/actuators, which control the platform flight parameters (in the case of rotating wing platforms, this control is expressed in the blade pitch, the rotating plain angle, and the tail rotor pitch). The cyclic output method involves modulating the cycle length and magnitude of the outputs to the servos/actuators such that, instead of a single incremental output calculated by the control algorithm, the output comprises a group (a cycle) of one or more outputs with of greater magnitude than the calculated output and followed by one or more outputs of lesser magnitude than the calculated output, the lesser magnitude are a function of the greater outputs. This overcomes the problems of output signal accuracy and lag response time required for proper control of various flight parameters. This unique innovative method can be implemented, using various basic control algorithms such as PID (proportional, integral and differential) control or fuzzy logic control algorithm, as an intermediate layer between the calculated outputs of the basic control algorithm and the actual outputs to the servos/actuators.

The invention further provides disengagement of the flight control system if an extreme nonstable event is detected by the disengagement system. In that event, the flight control system is switched to neutral mode for as long as required till the stabilizing system recovers the platform to a state of acceptable stability. After recovering, the flight control system is automatically reengaged.

The invention further provides a higher level of operational safety by due to the invention's architecture of two separate systems. In case of a temporary or major failure in the flight control system, one of its components, or sensors such as GPS (global positioning system), the stabilization system will maintain the platform balanced until recovery or will perform an emergency autorotation landing.

The invention further provides the user with a remote control interface to the flight control system, enabling the user to put the platform into semi-auto mode. In semi-auto mode the flight control system receives its flight parameters in real-time from user commands instead of from the preprogrammed flight plan. In this mode even an unskilled user can pilot the craft by remote control commands. The remote control interface can be software or hardware, for example, commands sent via keyboard.

The general problem solved by this invention is to provide fully autonomous control capability for nonstabilized flight platforms, especially but not limited to small scale platforms, such as short-range model helicopters.

The technology of the present invention enables pre-programmed controlled flight via flight/navigation plan in fully automatic mode. Or the platform can fly in semi-automatic mode, with a novice operator controlling some or all flight parameters using a simple command set. The novice user can, if he wishes, control direction then reengage the autonomous flight control for fully autonomous performance of operations that require pilot skills, such as: takeoff, hovering, flying and landing even in extreme weather conditions, without a need for manned involvement or interference.

The core technology and innovation is based on having separate, but integrated, dynamic stabilization system and flight control system, as well as on a unique output method developed for this application. The closest known technologies offer mainly two separate capabilities, stabilizers and autopilot:
Stabilizers for stabilized or nonstabilized flight platforms
Autopilots for stabilized platforms with some build-in stabilization capabilities

BRIEF DESCRIPTION OF THE INVENTION

There is thus provided a system for autonomous or semi-autonomous flight of a flight platform with flight actuators, the system comprising a stabilization subsystem for controlling the flight actuators to maintain stabilization of the flight platform in flight and a flight control subsystem for controlling the flight actuators to implement flight control of the flight platform in flight, the two subsystems operating separately, wherein the flight control subsystem is overridden by the stabilization subsystem in an event where the flight platform exceeds a predetermined stabilization threshold until the flight platform regains stability.

Furthermore, in accordance with some preferred embodiments of the present invention, the stabilization subsystem comprises stability measurement sensors, the sensors providing input to a stabilization control processing unit implementing a stabilization control algorithm, the stabilization control processing unit providing stabilization outputs to the flight actuators of the flight platform.

Furthermore, in accordance with some preferred embodiments of the present invention, a self-adjusting parameter set of the stabilization control algorithm is used.

Furthermore, in accordance with some preferred embodiments of the present invention, a preset parameter set of the stabilization control algorithm is used.

Furthermore, in accordance with some preferred embodiments of the present invention, the flight control subsystem comprises flight sensors measuring flight parameters, the flight sensors providing input to a flight control processing unit implementing a flight control algorithm, the flight control processing unit providing flight control outputs to the flight actuators of the flight platform.

Furthermore, in accordance with some preferred embodiments of the present invention, the flight control algorithm calculates required magnitudes of flight control outputs and produces, for each required magnitude, a group of outputs comprising at least one of a plurality of outputs of greater magnitudes than the required magnitude, and at least one of a plurality of outputs of lesser magnitudes than the required magnitude.

Furthermore, in accordance with some preferred embodiments of the present invention, in at least some of the groups of outputs, said at least one of a plurality of outputs of greater magnitudes precedes said at least one of a plurality of outputs of lesser magnitudes.

Furthermore, in accordance with some preferred embodiments of the present invention, the magnitudes of the lesser outputs relate by a function to the magnitudes of the greater outputs.

Furthermore, in accordance with some preferred embodiments of the present invention, the total number of outputs per group is constant.

Furthermore, in accordance with some preferred embodiments of the present invention, the total number of outputs of greater magnitudes per group is constant.

Furthermore, in accordance with some preferred embodiments of the present invention, the total number of outputs of lesser magnitudes per group is constant.

Furthermore, in accordance with some preferred embodiments of the present invention, upon occurrence of a predefined fault in the flight control subsystem, the stabilization subsystem maintains the flight platform balanced until the flight control subsystem recovers.

Furthermore, in accordance with some preferred embodiments of the present invention, the stabilization subsystem maintains the flight platform stabilization until the flight control subsystem performs an emergency landing.

Furthermore, in accordance with some preferred embodiments of the present invention, the system is further provided with a ground station in communication with the flight control subsystem, whereby an operator can override the flight control subsystem with manual flight commands.

Furthermore, in accordance with some preferred embodiments of the present invention, there is provided a method for autonomous or semi-autonomous flight of a flight platform with flight actuators, the method comprising
providing a stabilization subsystem for controlling the flight actuators and a flight control subsystem for controlling the flight actuators, the two subsystems operating separately,
maintaining stabilization of the flight platform in flight by controlling the flight actuators using the stabilization subsystem, and
implementing flight control of the flight platform in flight by controlling the flight actuators using the flight control subsystem implement flight control, overriding the flight control subsystem by the stabilization subsystem in an event where the flight platform exceeds a predetermined stabilization threshold until the flight platform regains stability.

Furthermore, in accordance with some preferred embodiments of the present invention, maintaining stabilization is achieved using a stabilization control algorithm with a self-adjusting parameter set.

Furthermore, in accordance with some preferred embodiments of the present invention, maintaining stabilization is achieved using a stabilization control algorithm with a preset parameter set.

Furthermore, in accordance with some preferred embodiments of the present invention, implementing flight control is carried out using a flight control algorithm that generates flight control outputs.

Furthermore, in accordance with some preferred embodiments of the present invention, the flight control algorithm calculates required magnitudes of flight control outputs and produces, for each required magnitude, a group of outputs comprising at least one of a plurality of outputs of greater magnitudes than the required magnitude, and at least one of a plurality of outputs of lesser magnitudes than the required magnitude.

Furthermore, in accordance with some preferred embodiments of the present invention, in at least some of the groups of outputs, said at least one of a plurality of outputs of greater magnitudes precedes said at least one of a plurality of outputs of lesser magnitudes.

Furthermore, in accordance with some preferred embodiments of the present invention, the magnitudes of the lesser outputs relate by a function to the magnitudes of the greater outputs.

Furthermore, in accordance with some preferred embodiments of the present invention, the total number of outputs per group is constant.

Furthermore, in accordance with some preferred embodiments of the present invention, the total number of outputs of greater magnitudes per group is constant.

Furthermore, in accordance with some preferred embodiments, of the present invention, the total number of outputs of lesser magnitudes per group is constant.

Furthermore, in accordance with some preferred embodiments of the present invention, upon occurrence of a pre-defined fault in the flight control subsystem, stabilization is maintained by the stabilization subsystem until the flight control subsystem recovers.

Furthermore, in accordance with some preferred embodiments of the present invention, stabilization is maintained by the stabilization subsystem until the flight control subsystem performs an emergency landing.

BRIEF DESCRIPTION OF THE FIGURES

The invention is described herein, by way of example only, with reference to the accompanying Figures, in which like components are designated by like reference numerals.

DETAILED DESCRIPTION OF THE INVENTION

The flight control and stabilization system of the present invention combines two layers:
a. Stabilization System 1
b. Flight Control System 2

Stabilization system 1 is the basic standalone lower level layer, providing aerodynamic stabilization of the manned or unmanned flight platform. The stabilization system I performs (with preset or dynamically adjustable parameters), high-degree stabilization that reduces the amount of flight control effort, including piloting, required to control the platform.

The aerodynamic stabilization of the nonstabilized platform achieved by the stabilization system prepares and provides for the higher level flight control (including piloting) by stabilizing the flight platform. The higher level flight control can be implemented via a flight control system (hardware and software), actual manned control, or a combination of the two.

Figure 1:
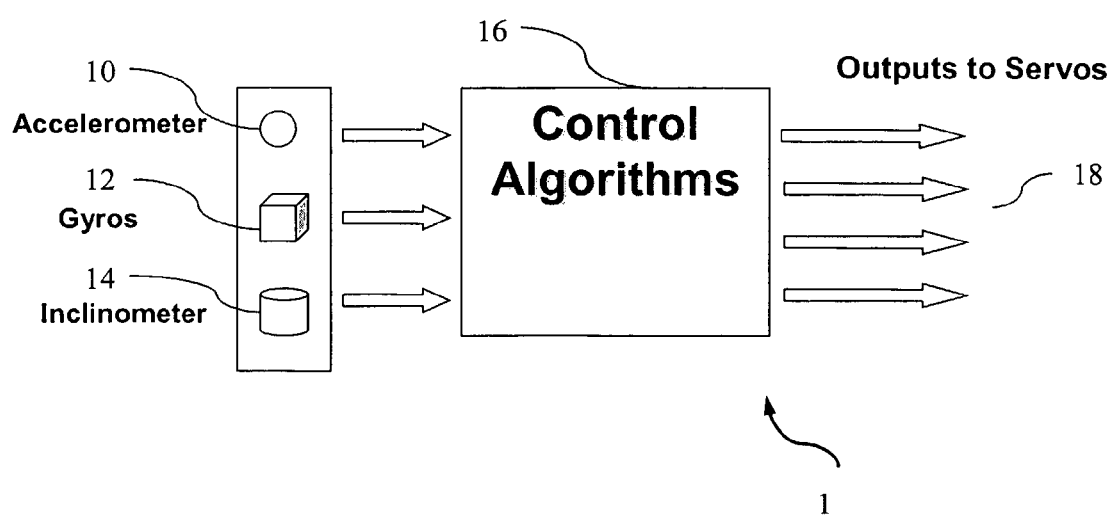
FIG. 1 is a diagram of a stabilization system for a flight platform in accordance with a preferred embodiment of the present invention.

With reference to FIG. 1, stabilization system 1 comprises sensor inputs (such as accelerometers 10, gyroscopes 12, and inclinometers 14), control algorithms 16 (typically implemented as software running on a processing unit, such as the platform's computer or a dedicated computer) and output signals 18 to the actuators. (Throughout this specification, actuator is used synonymously for servo.) The sensors measure the various platform parameters, such as position, speed, and acceleration for up to 6 axes (linear and angular for X, Y, and Z=6 axes).

Control algorithms 16 receive the sensor input signals and process correction output signals 18 to the platform servos/actuators in order to maintain the platform stabilization. The control algorithms can run on the flight platform's processing unit or on a dedicated processing unit connected via outputs to the actuators.

Figure 2:
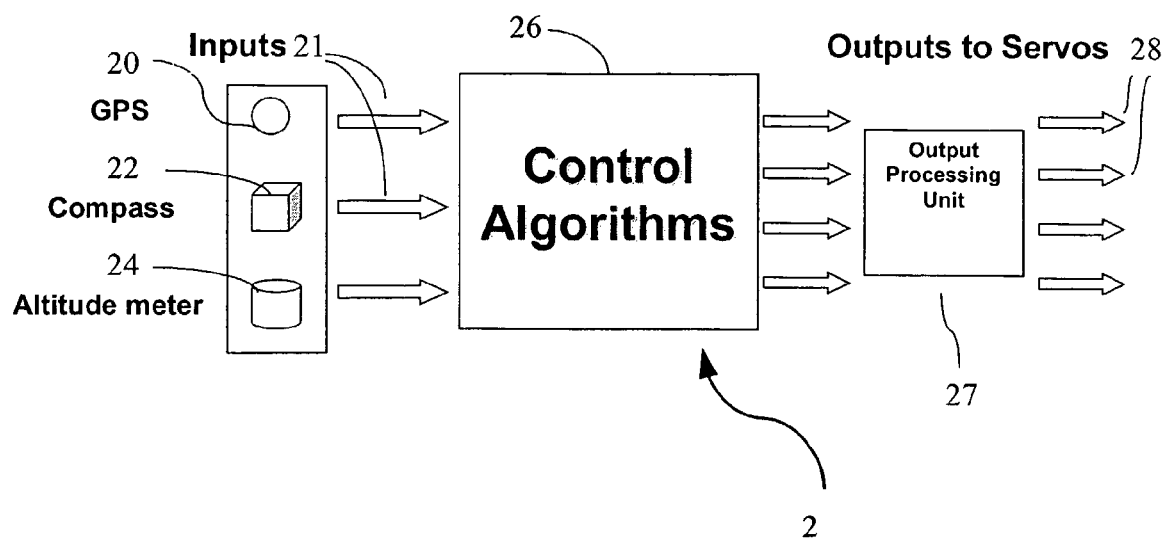
FIG. 2 is a diagram of a flight control system for a flight platform in accordance with a preferred embodiment of the present invention.

With reference to FIG. 2, flight control system 2 is the second standalone layer, on top of stabilization system 1 and providing autonomous flight capabilities for the manned or unmanned flight platform, with control algorithms 26 designed to control a non-stabilized flight platform with a preset or dynamic adjustable stabilization system 1 operating at a lower level.

Input to flight control system 2 comes from measuring sensors, which measure various parameters such as: position, heading, speed, acceleration and altitude. Examples of measuring sensors can include global positioning system (GPS) 20, compass 22, and altitude meter 24.

The input from the measuring sensors is processed by control algorithms 26 (typically implemented as software running on a processing system, such as the platform's computer or a dedicated computer connected by outputs to the platform's actuators). Control algorithms can be traditional methods such as simple PID control or other methods such as fuzzy logic.

Output from control algorithms 26 passes to output processing unit 27, which can be implemented as part of control algorithm 26 or separately.

Output processing unit 27 generates correction output signals 28 to the platform's servos/actuators in order to perform the required flight functions such as takeoff, flying, hovering, and landing with the required flight parameters, envelope and performance such as: positioning (x.y.z), velocity and heading in various windy and weather conditions.

Figure 3:
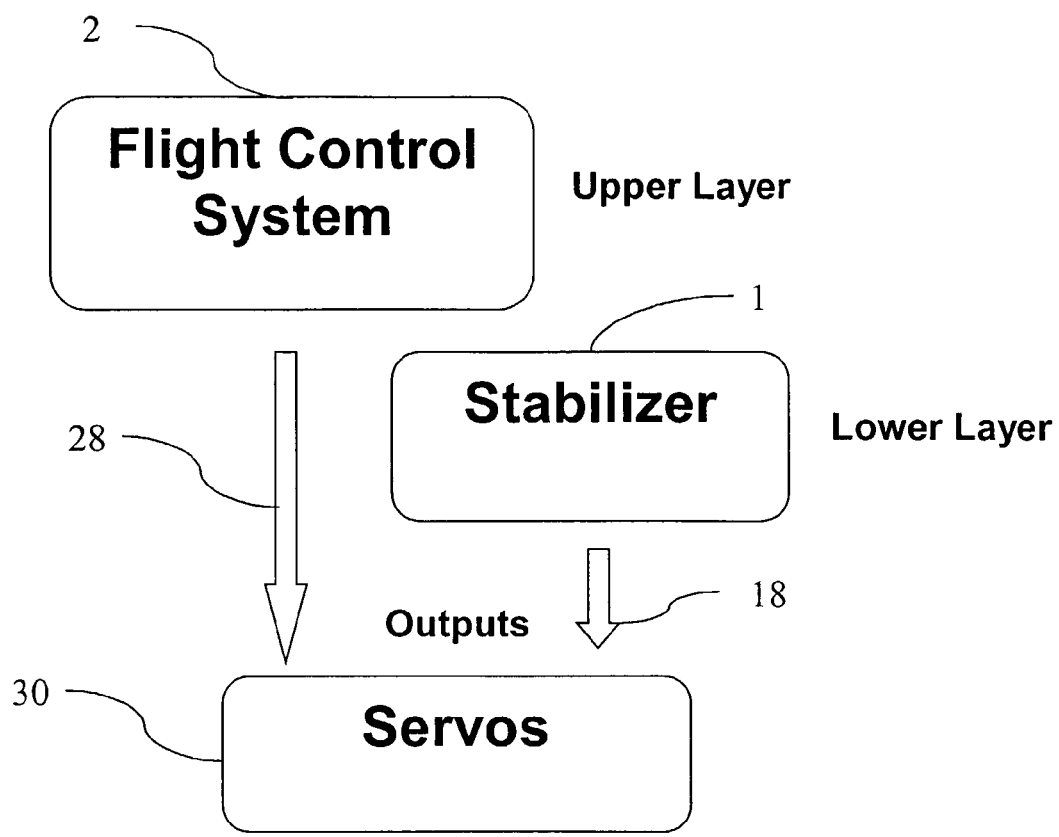
FIG. 3 is a diagram of the architecture of a dual-level system for stabilizing and flying a flight platform in accordance with a preferred embodiment of the present invention.

FIG. 3 illustrates the "dual-layer" architecture of the present invention for controlling the flight parameters of nonstabilized platforms: the architecture combines two independent standalone layers: base layer of stabilization system 1 and upper layer of flight control system 2.

Base layer 1 provides the stabilization capabilities of the nonstabilized platform. This means that when a pilot or unmanned flight control system flies the flight platform, the platform will behave and respond same as an inherently stabilized platform.

Figure 4:
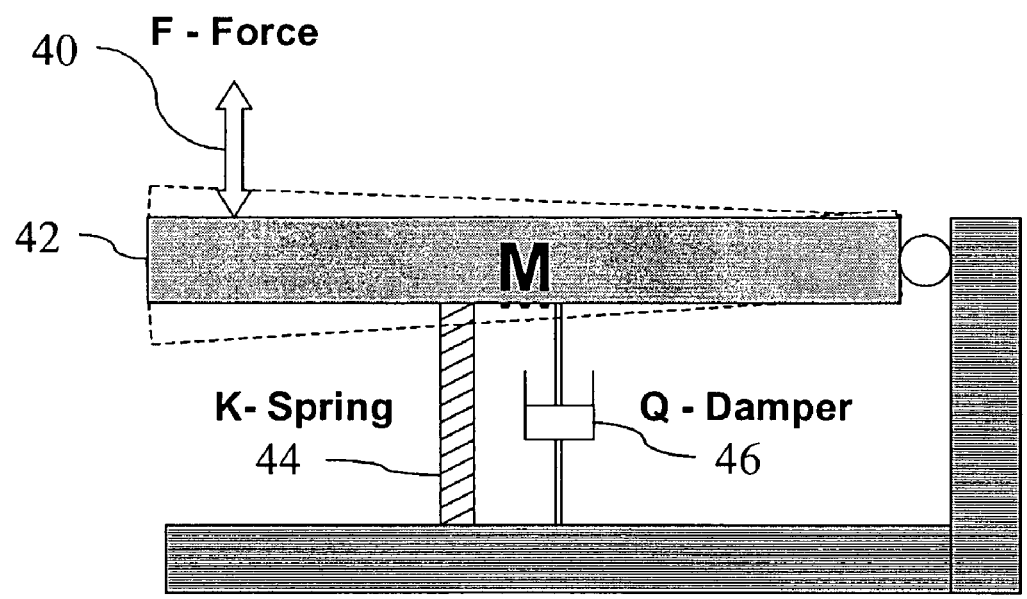
FIG. 4 is a diagram illustrating the forces acting on a flight platform in accordance with a preferred embodiment of the present invention.

With reference to FIG. 4, stabilization system 1 stabilization parameters K 44 and Q 46 can be preset or they can be dynamically recalculated during flight in accordance with accordance with changes in the environment (F 40), such as wind speed, or changes in platform parameters M 42 such as weight or speed.

Flight control algorithms 26 calculate outputs 28 via output processing unit 27 as a function of the required flight parameters such as: positioning, speed, and direction. The outputs are calculated on a group basis in a time interval of sub-seconds.

Figure 5:
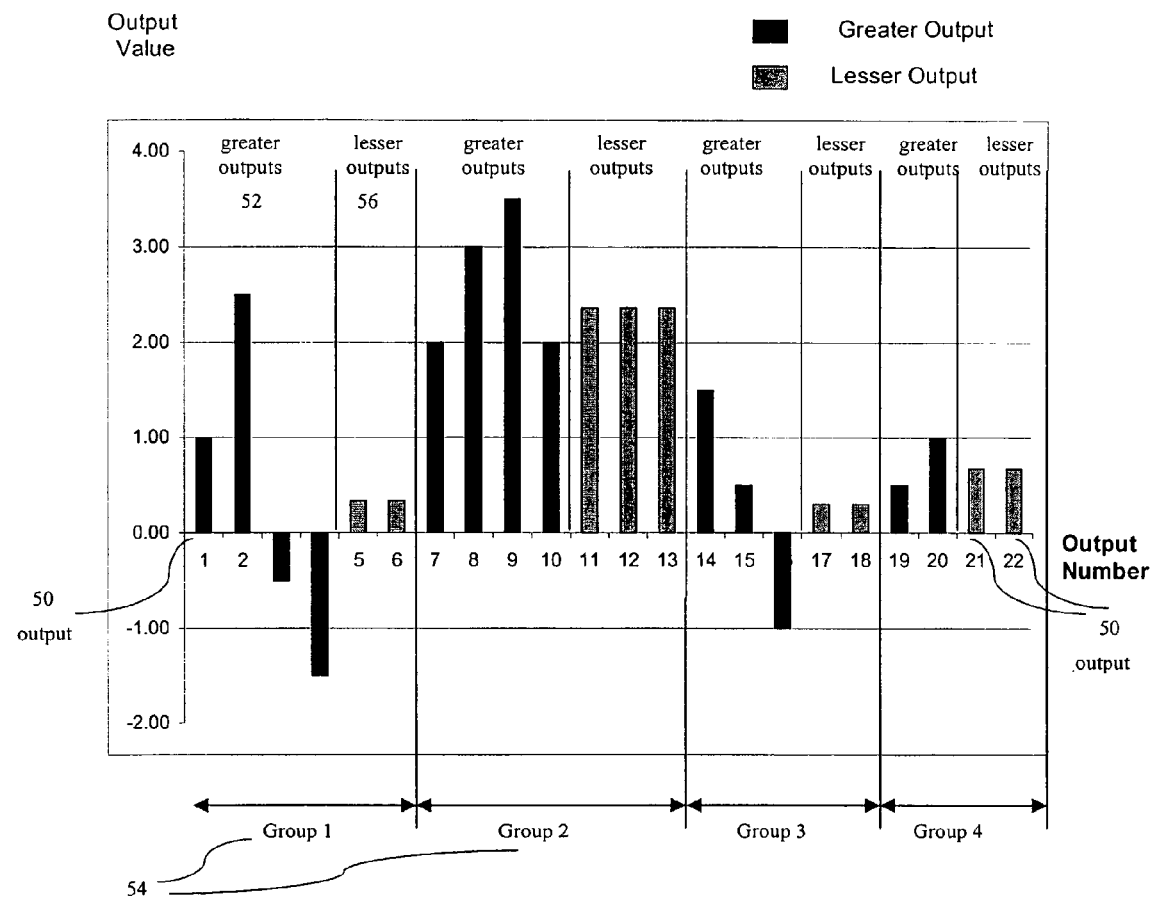
FIG. 5 illustrates modulated outputs to servos/actuators in accordance with a preferred embodiment of the present invention.

Another innovation of the present invention, in addition to the separation of stabilization 1 and flight control 2, is the method of processing the values of the flight control outputs 28 implemented by the output processing unit 27. The values are calculated to overcome control problems related to non-stabilized platforms, especially small-scale platforms. FIG. 5 illustrates four groups 54 of outputs 50 to servos/actuators in accordance with a preferred embodiment of the present invention.

Each group 54 comprises one or more outputs 50 of greater magnitudes 52 followed by one or more outputs 50 of lesser magnitudes 56. The output method implemented by the output processing unit 27 overcomes accuracy and resolution issues. Lesser outputs 56 are calculated as a function of the greater outputs 52. This calculation can involve just the greater outputs from the same group as the lesser outputs or the greater outputs from several groups.

The group 54 size (total number of outputs) and the quantity of greater outputs and the quantity of lesser outputs making up that total, can be recalculated and adjusted in accordance with changes in external environment, such as wind speed, wind direction and/or changes in platform parameters, such as its weight.

The following parameters are calculated by output processing unit 27:

Total number of greater 52 and lesser outputs 56 per group 54

Quantity of greater outputs and quantity of lesser outputs 56 per group

Greater output values 52

Lesser output values 56

Figure 6:
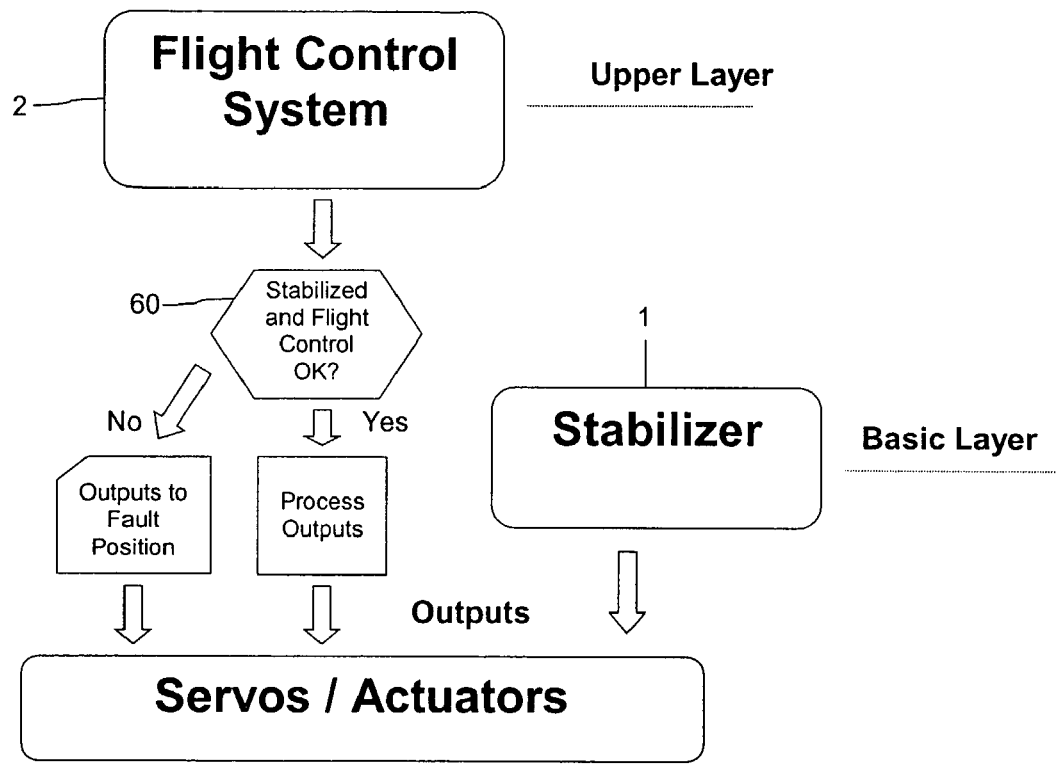
FIG. 6 illustrates the auto-detach mechanism of the flight control system in accordance with a preferred embodiment of the present invention.

FIG. 6 illustrates the auto-detach mechanism of the flight control system in accordance with a preferred embodiment of the present invention. Since the stabilization system 1 and flight control system 2 are totally independent, in a case of an extreme nonstabilization event, and in order to enable fast recovery out of nonstabilized situations, various platform parameters such as: positions, slope, speed and acceleration are monitored and checked 60. In case of detection of a nonstabilized event, the outputs 28 from flight control system 2 are stopped in order to avoid interference, while stabilization system 1 continues to process signals in order to recover from the event and to stabilize the platform.

Another possibility of separation between the stabilization system 1 and the flight control system 2 is during temporary or major failure in the flight control system. In such an event, the stabilization system will maintain the platform balanced till recovery from the temporary failure event or will enable an emergency autorotation landing while keeping balanced.

Immediately after recovery, flight control system 2 resumes processing output signals 28 in order to maintain the requested flight parameters.

Figure 7:
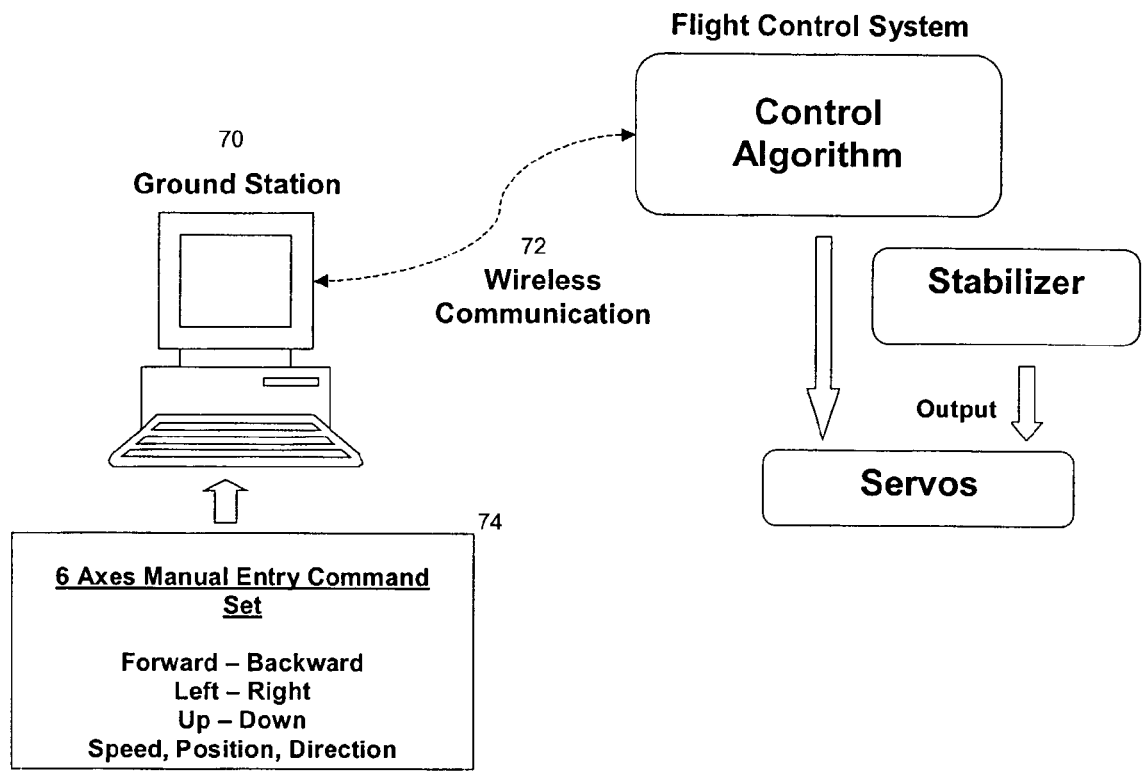
FIG. 7 is a diagram showing optional integrated manual flight control in a preferred embodiment of the present invention.

FIG. 7 is a diagram showing how a user, even an unskilled user, can manually control some or all of the flight control, handing control back to the system whenever necessary, in a preferred embodiment of the present invention. The flight control system enables manual control of the flight parameters in all 6 axes, with the operator using a simple command set 74 (directly or through an interface), entered from a ground station 60.

The commands are loaded to the flight control system via wireless communication 72 via a computer interface (software or hardware). The same wireless communication channel 72 can be used to download the flight plan before takeoff or to update the flight plan during flight.

The present invention can be applied in full or in part for many stable and nonstable flight platforms. It is particularly of value for small-scale nonstable platforms, such as remote controlled helicopters. Below are examples of components that could be used in an implementation of the present invention.

Example of a flight platform that was used in tests carried out on a prototype: from Bergen R/C Helicopters Corporation, model Industrial Twin (helicopter) with 52 cc boxer engine.

Examples of sensors that were used as inputs to the stabilizer control algorithm and output processing in a prototype:
   a. Dual-axis accelerometers from Analog Devices Corporation, model DXL202.
   b. Piezoelectric vibrating gyroscopes from Murata Corporation, model GYROSTAR.
   c. Inclinometer from Pewatron Corporation, model UV-2HF-SW2.

Example of a processing unit for stabilization inputs/outputs (I/O) and stabilization control algorithm processing, as well as for data storage and access functionality, all used in a prototype: ST Microelectronics Corporation, microcontroller model ST-uPSD3234a.

Examples of inputs to the flight control algorithm and output processing used in a prototype:
   a. GPS from Novatel Corporation, model PowerPak-OEM3 MILLENIUM STD.
   b. Compass and tilt sensors from Advanced Orientation Systems, Inc., model EZ-COMPASS3.
   c. Upper altitude range barometric sensor from Motorola Corporation, model MPX2100A.
   d. Lower altitude range ultrasonic sensor from Senix Corporation, model Ultra-U.

Example of a processing unit for the flight control algorithms and I/O, including serving as the output processing unit 27 that were used in a prototype: ST Microelectronics Corporation model ST-uPSD3234a (same as used as example for running stabilization system algorithm).

It should be clear that the description of the embodiments and attached Figures set forth in this specification serves only for a better understanding of the invention, without limiting its scope as covered by the following Claims.

It should also be clear that a person skilled in the art, after reading the present specification could make adjustments or amendments to the attached Figures and above described embodiments that would still be covered by the following Claims.

The invention claimed is:

1. A system for autonomous or semi-autonomous flight of a flight platform with flight actuators, the system comprising a stabilization subsystem for controlling the flight actuators to maintain aerodynamic stabilization of the flight platform in flight and a flight control subsystem for controlling the flight and navigation actuators to implement flight control of the flight platform in flight, the two subsystems operating separately, wherein the flight control subsystem is overridden by the stabilization subsystem in an event where the flight platform exceeds a predetermined stabilization threshold until the flight platform regains stability.

2. The system of claim 1, wherein the stabilization subsystem comprises stability measurement sensors, the sensors providing input to a stabilization control processing unit implementing a stabilization control algorithm, the stabilization control processing unit providing stabilization outputs to the flight actuators of the flight platform.

3. The system of claim 2 wherein a self-adjusting parameter set of the stabilization control algorithm is used.

4. The system of claim 2 wherein a preset parameter set of the stabilization control algorithm is used.

5. The system of claim 1, wherein the flight control subsystem comprises flight sensors measuring flight parameters, the flight sensors providing input to a flight control processing unit implementing a flight control algorithm, the flight control processing unit providing flight control outputs to the flight actuators of the flight platform.

6. The system of claim 5 wherein the flight control algorithm calculates required magnitudes of flight control outputs and produces, for each required magnitude, a group of outputs comprising at least one of a plurality of outputs of greater magnitudes than the required magnitude, and at least one of a plurality of outputs of lesser magnitudes than the required magnitude.

7. The system of claim 6, wherein, in at least some of the groups of outputs, said at least one of a plurality of outputs of greater magnitudes precedes said at least one of a plurality of outputs of lesser magnitudes.

8. The system of claim 6 wherein the magnitudes of the lesser outputs relate by a function to the magnitudes of the greater outputs.

9. The system of claim 6 wherein the total number of outputs per group is constant.

10. The system of claim 6 wherein the total number of outputs of greater magnitudes per group is constant.

11. The system of claim 6 wherein the total number of outputs of lesser magnitudes per group is constant.

12. The system of claim 1 wherein, upon occurrence of a predefined fault in the flight control subsystem, the stabilization subsystem maintains the flight platform balanced until the flight control subsystem recovers.

13. The system of claim 12 wherein the stabilization subsystem maintains the flight platform stabilization until the flight control subsystem performs an emergency landing.

14. The system of claim 1 further provided with a ground station in communication with the flight control subsystem, whereby an operator can override the flight control subsystem with manual flight commands.

15. A method for autonomous or semi-autonomous flight of a flight platform with flight actuators, the method comprising:
providing a stabilization subsystem for controlling the flight actuators and a flight control subsystem for controlling the flight actuators, the two subsystems operating separately,
maintaining aerodynamic stabilization of the flight platform in flight by controlling the flight actuators using the stabilization subsystem,
implementing flight and navigation control of the flight platform in flight by controlling the flight actuators using the flight control subsystem to, and
overriding the flight control subsystem by the stabilization subsystem in an event where the flight platform exceeds a predetermined stabilization threshold until the flight platform regains stability.

16. The method of claim 15 wherein maintaining aerodynamic stabilization is achieved using a stabilization control algorithm with a self-adjusting parameter set.

17. The method of claim 15 wherein maintaining aerodynamic stabilization is achieved using a stabilization control algorithm with a preset parameter set.

18. The method of claim 15, wherein implementing flight and navigation control is carried out using a flight control algorithm that generates flight control outputs.

19. The method of claim 18 wherein the flight control algorithm calculates required magnitudes of flight control outputs and produces, for each required magnitude, a group of outputs comprising at least one of a plurality of outputs of greater magnitudes than the required magnitude. and at least one of a plurality of outputs of lesser magnitudes than the required magnitude.

20. The method of claim 19, wherein, in at least some of the groups of outputs, said at least one of a plurality of outputs of greater magnitudes precedes said at least one of a plurality of outputs of lesser magnitudes.

21. The method of claim 19 wherein the magnitudes of the lesser outputs relate by a function to the magnitudes of the greater outputs.

22. The method of claim 19 wherein the total number of outputs per group is constant.

23. The method of claim 19 wherein the total number of outputs of greater magnitudes per group is constant.

24. The method of claim 19 wherein the total number of outputs of lesser magnitudes per group is constant.

25. The method of claim 15 wherein, upon occurrence of a predefined fault in the flight control subsystem, stabilization is maintained by the stabilization subsystem until the flight control subsystem recovers.

26. The method of claim 25, wherein stabilization is maintained by the stabilization subsystem until the flight control subsystem performs an emergency landing.

* * * * *